(12) United States Patent
Zheng et al.

(10) Patent No.: US 9,121,297 B2
(45) Date of Patent: Sep. 1, 2015

(54) ROTATING BRUSH SEAL

(75) Inventors: Xiaoqing Zheng, Niskayuna, NY (US); William Edward Adis, Scotia, NY (US); Bernard Arthur Couture, Jr., Schenectady, NY (US); Michael Dennis Mack, Ballston Spa, NY (US); Kristan Brice Sears, Binghamton, NY (US)

(73) Assignee: General Electric Company, Schenectady, NY (US)

( * ) Notice: Subject to any disclaimer, the term of this patent is extended or adjusted under 35 U.S.C. 154(b) by 967 days.

(21) Appl. No.: 13/073,145

(22) Filed: Mar. 28, 2011

(65) Prior Publication Data
US 2012/0251303 A1 Oct. 4, 2012

(51) Int. Cl.
F01D 11/00 (2006.01)
F04D 29/08 (2006.01)
F16J 15/32 (2006.01)

(52) U.S. Cl.
CPC ........... *F01D 11/001* (2013.01); *F16J 15/3288* (2013.01); *F05D 2240/56* (2013.01)

(58) Field of Classification Search
CPC ....... F01D 11/00; F01D 11/001; F01D 11/02; F01D 11/12; F16J 15/3288; F05B 2240/571; F05D 2240/56; F04D 29/08; F04D 29/10
USPC .................. 415/173.1, 173.3, 174.2; 277/355
See application file for complete search history.

(56) References Cited

U.S. PATENT DOCUMENTS

| | | | |
|---|---|---|---|
| 885,032 A * | 4/1908 | Ferranti | 415/173.6 |
| 2,878,048 A * | 3/1959 | Peterson | 277/355 |
| 3,917,150 A * | 11/1975 | Ferguson et al. | 228/159 |
| 4,595,207 A * | 6/1986 | Popp | 277/303 |
| 5,029,875 A * | 7/1991 | Spain et al. | 277/307 |
| 5,090,710 A * | 2/1992 | Flower | 277/355 |
| 5,316,318 A * | 5/1994 | Veau | 277/355 |
| 5,425,543 A * | 6/1995 | Buckshaw et al. | 277/350 |
| 5,496,045 A | 3/1996 | Millener et al. | |
| 5,752,802 A * | 5/1998 | Jones | 415/170.1 |
| 5,799,952 A | 9/1998 | Morrison et al. | |
| 5,944,320 A * | 8/1999 | Werner et al. | 277/355 |
| 5,961,280 A | 10/1999 | Turnquist et al. | |

(Continued)

FOREIGN PATENT DOCUMENTS

| | | |
|---|---|---|
| EP | 1066480 A2 | 1/2001 |
| EP | 1130294 A2 | 9/2001 |

(Continued)

OTHER PUBLICATIONS

Holloway et al., "Rotating Intershaft Brush Seal for Sealing between Rotating Shafts, Part I—Experimental Performance Evaluation Compared to Mechanical Design Analysis", 43rd AIAA/ASME/SAE/ASEE Joint Propulsion Conference & Exhibit, Jul. 8-11, 2007, Cincinnati, OH, AIAA 2007-5732, 19 pages.

(Continued)

*Primary Examiner* — Dwayne J White
*Assistant Examiner* — Joshua R Beebe

(57) ABSTRACT

A brush seal for use between a rotating component and a stationary component in a turbomachine is disclosed. The brush seal according to embodiments of this invention include a set of bristles having a fixed end and a free end, wherein the fixed end is attached to the rotating component, and wherein the set of bristles are angled axially with respect to the rotating component.

18 Claims, 8 Drawing Sheets

(56) References Cited

U.S. PATENT DOCUMENTS

| | | | |
|---|---|---|---|
| 5,997,004 A * | 12/1999 | Braun et al. | 277/352 |
| 6,010,132 A * | 1/2000 | Bagepalli et al. | 277/355 |
| 6,012,723 A * | 1/2000 | Beeck | 277/355 |
| 6,131,910 A | 10/2000 | Bagepalli et al. | |
| 6,161,836 A | 12/2000 | Zhou | |
| 6,173,962 B1 | 1/2001 | Morrison et al. | |
| 6,226,975 B1 | 5/2001 | Ingistov | |
| 6,293,553 B1 | 9/2001 | Werner et al. | |
| 6,308,959 B1 | 10/2001 | Sokolihs et al. | |
| 6,318,728 B1 | 11/2001 | Addis et al. | |
| 6,352,263 B1 | 3/2002 | Gail et al. | |
| 6,488,471 B1 * | 12/2002 | Stibich et al. | 415/173.3 |
| 6,502,823 B1 | 1/2003 | Turnquist et al. | |
| 6,505,834 B1 | 1/2003 | Dinc et al. | |
| 6,547,522 B2 | 4/2003 | Turnquist et al. | |
| 6,550,777 B2 | 4/2003 | Turnquist et al. | |
| 6,622,490 B2 | 9/2003 | Ingistov | |
| 6,695,314 B1 | 2/2004 | Gail et al. | |
| 6,786,488 B2 | 9/2004 | Laurello et al. | |
| 6,840,518 B2 | 1/2005 | Boston | |
| 6,880,829 B1 | 4/2005 | Datta | |
| 7,032,903 B1 | 4/2006 | Dalton et al. | |
| 7,165,771 B2 | 1/2007 | Beichl et al. | |
| 7,168,708 B2 * | 1/2007 | Dalton et al. | 277/355 |
| 7,182,345 B2 | 2/2007 | Justak | |
| 7,201,378 B2 | 4/2007 | Kono | |
| 7,255,352 B2 | 8/2007 | Adis et al. | |
| 7,384,235 B2 | 6/2008 | Adis | |
| 7,410,173 B2 | 8/2008 | Justak | |
| 7,445,212 B2 | 11/2008 | Gail et al. | |
| 7,445,424 B1 | 11/2008 | Ebert et al. | |
| 7,461,847 B2 | 12/2008 | Short et al. | |
| 7,549,835 B2 | 6/2009 | Brillert | |
| 7,565,729 B2 | 7/2009 | Adis et al. | |
| 7,628,581 B2 | 12/2009 | De Simone et al. | |
| 7,653,993 B2 | 2/2010 | Couture et al. | |
| 7,717,671 B2 | 5/2010 | Addis | |
| 7,909,334 B2 | 3/2011 | Beichl et al. | |
| 8,075,254 B2 | 12/2011 | Morgan et al. | |
| 8,317,464 B2 | 11/2012 | Alamsetty et al. | |
| 2002/0050684 A1 | 5/2002 | Kono | |
| 2003/0151207 A1 * | 8/2003 | Shore | 277/355 |
| 2004/0100033 A1 * | 5/2004 | Tong et al. | 277/411 |
| 2005/0073106 A1 | 4/2005 | Thermos et al. | |
| 2005/0110218 A1 | 5/2005 | Morrison et al. | |
| 2005/0111967 A1 * | 5/2005 | Couture et al. | 415/173.4 |
| 2005/0179207 A1 | 8/2005 | Datta | |
| 2005/0194747 A1 * | 9/2005 | Morgan et al. | 277/358 |
| 2005/0285345 A1 | 12/2005 | Webster | |
| 2006/0021218 A1 | 2/2006 | McMillan | |
| 2006/0214378 A1 | 9/2006 | Zheng | |
| 2006/0249911 A1 * | 11/2006 | Kowalczyk et al. | 277/355 |
| 2007/0018409 A1 | 1/2007 | Justak | |
| 2007/0069478 A1 * | 3/2007 | Riggi et al. | 277/500 |
| 2007/0079493 A1 | 4/2007 | Couture et al. | |
| 2007/0096397 A1 | 5/2007 | Justak | |
| 2007/0120327 A1 | 5/2007 | Justak | |
| 2007/0214628 A1 | 9/2007 | Adis et al. | |
| 2007/0245532 A1 * | 10/2007 | Bracken et al. | 29/23.51 |
| 2008/0095616 A1 | 4/2008 | Alvanos et al. | |
| 2008/0258403 A1 | 10/2008 | Beichl et al. | |
| 2008/0284107 A1 * | 11/2008 | Flaherty et al. | 277/355 |
| 2008/0309019 A1 | 12/2008 | Wolfe et al. | |
| 2009/0050410 A1 * | 2/2009 | Berberich | 184/6.11 |
| 2009/0072486 A1 * | 3/2009 | Datta | 277/355 |
| 2009/0196742 A1 | 8/2009 | Turnquist et al. | |
| 2009/0322028 A1 | 12/2009 | Wright et al. | |
| 2010/0034644 A1 | 2/2010 | Scricca | |
| 2010/0054924 A1 | 3/2010 | Uyama et al. | |
| 2010/0064499 A1 | 3/2010 | Couture et al. | |
| 2010/0068042 A1 | 3/2010 | Bruck et al. | |
| 2010/0320696 A1 | 12/2010 | Gail et al. | |
| 2013/0277918 A1 * | 10/2013 | Fitzgerald et al. | 277/355 |

FOREIGN PATENT DOCUMENTS

| | | |
|---|---|---|
| EP | 1169585 A1 | 1/2002 |
| EP | 1235010 A2 | 8/2002 |
| EP | 1269048 A1 | 1/2003 |
| EP | 1312840 A2 | 5/2003 |
| EP | 1331423 A2 | 7/2003 |
| EP | 1353097 A2 | 10/2003 |
| EP | 1388695 A2 | 2/2004 |
| EP | 1391642 A2 | 2/2004 |
| EP | 1508671 A1 | 2/2005 |
| EP | 1510655 A1 | 3/2005 |
| EP | 1715223 A2 | 10/2006 |
| EP | 1783406 A2 | 5/2007 |
| EP | 1918523 A2 | 5/2008 |
| EP | 1947297 A2 | 7/2008 |
| EP | 2052171 A1 | 4/2009 |
| JP | 2005061587 | 8/2006 |
| JP | 2005337448 | 6/2007 |
| JP | 2007139045 | 12/2008 |
| JP | 2008064260 | 10/2009 |
| WO | 9942704 A1 | 8/1999 |
| WO | 0045070 A1 | 8/2000 |
| WO | 0155625 A1 | 8/2001 |
| WO | 0175339 A1 | 10/2001 |
| WO | 2005001316 A1 | 1/2005 |
| WO | 2005091994 A2 | 10/2005 |
| WO | WO 2005/091994 A2 * | 10/2005 |
| WO | 2007070071 A2 | 6/2007 |
| WO | 2008020002 A1 | 2/2008 |
| WO | 2008094761 A1 | 8/2008 |
| WO | 2009010040 A1 | 1/2009 |

OTHER PUBLICATIONS

Mehta et al., "Rotating Intershaft brush Seal for Sealing between Rotating Shafts Part II—Experimental Data Evaluation and Modeling of the Brush Seal Leakage Flows", 43rd AIAA/ASME/SAE/ASEE Joint Propulsion Conference & Exhibit Jul. 8-11, 2007, Cincinnati, OH, AIAA 2007-5733, 16 pages.

Holloway et al., Innovative Rotating Intershaft Brush Seal for Sealing Between Rotating Shafts Part I—Mechanical Design of The Rotating Brush Seal, 42nd AIAA/ASME/SAE/ASEE Joint Propulsion Conference & Exhibit Jul. 9-12, 2006, Sacramento, California, AIAA 2006-4751, 21 pages.

Mehta et al., "Innovative Rotating Intershaft Brush Seal for Sealing Between Rotating Shafts Part II—Modeling of Brush Seal Leakage Flows", 42nd AIAA/ASME/SAE/ASEE Joint Propulsion Conference & Exhibit, Jul. 9-12, 2006, Sacramento, California, AIAA 2006-4752, 14 pages.

Peters, Office Action Communication for U.S. Appl. No. 12/987,052 dated Jul. 18, 2013, 13 pages.

Peters, Office Action Communication for U.S. Appl. No. 12/987,052 dated Dec. 3, 2013, 10 pages.

Peters, Office Action Communication for U.S. Appl. No. 12/987,052 dated Jan. 30, 2014, 16 pages.

Peters, Office Action Communication for U.S. Appl. No. 12/987,052 dated Feb. 27, 2014, 11 pages.

Peters, Notice of Allowance and Fee(s) Due for U.S. Appl. No. 12/987,052 dated Apr. 8, 2014, 14 pages.

Lattime, S.B., et al., Rotating Brush Seal, International Journal of Rotating Machinery, 8(2): 153-160 (2002).

* cited by examiner

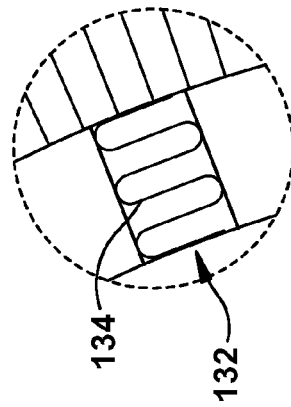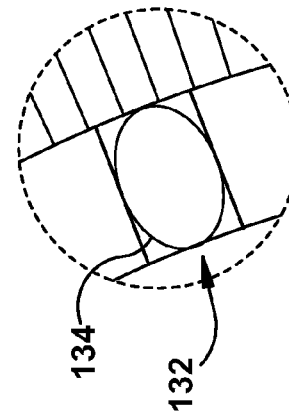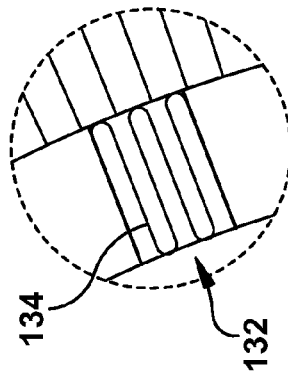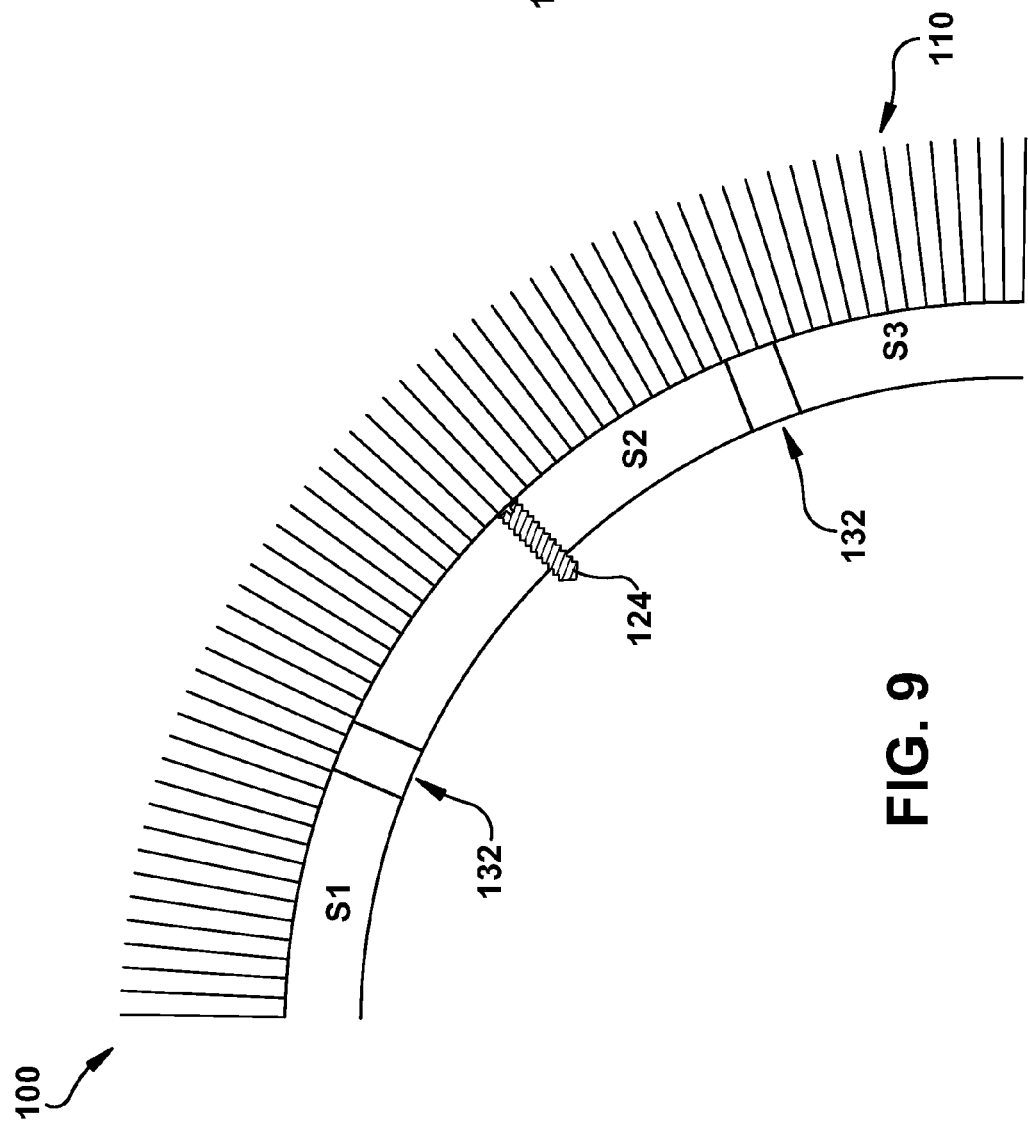

ROTATING BRUSH SEAL

BACKGROUND OF THE INVENTION

Embodiments of the invention relate generally to brush seals and, more particularly, to a rotating brush seal attached to a rotating component wherein the bristles of the brush seal are angled axially, more than circumferentially.

Known brush seals are typically mounted or attached to a stationary component of a turbomachine, where only the flexible bristle tips of the brush seal engage a rotating component during operation of the turbomachine to form a dynamic seal. Known brush seals also typically include bristles that are angled circumferentially with respect to the rotating component.

BRIEF DESCRIPTION OF THE INVENTION

In one embodiment, the invention provides a brush seal for use between a rotating component and a stationary component in a turbomachine, the brush seal comprising: a set of bristles having a fixed end and a free end, wherein the fixed end is attached to the rotating component, and wherein the set of bristles are angled axially at an axial angle with respect to the rotating component.

In another embodiment, the invention provides a turbomachine comprising: a rotating component; a stationary component; and a brush seal for use between the rotating component and the stationary component, the brush seal comprising: a set of bristles having a fixed end and a free end, wherein the fixed end is attached to the rotating component, and wherein the set of bristles are angled axially at an axial angle with respect to the rotating component.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 9 shows an axial cross-sectional view of a portion of a brush seal according to embodiments of this invention.

FIGS. 10-12 show exploded views of gaps between arcuate segments of a brush seal according to embodiments of this invention.

Figure 1:
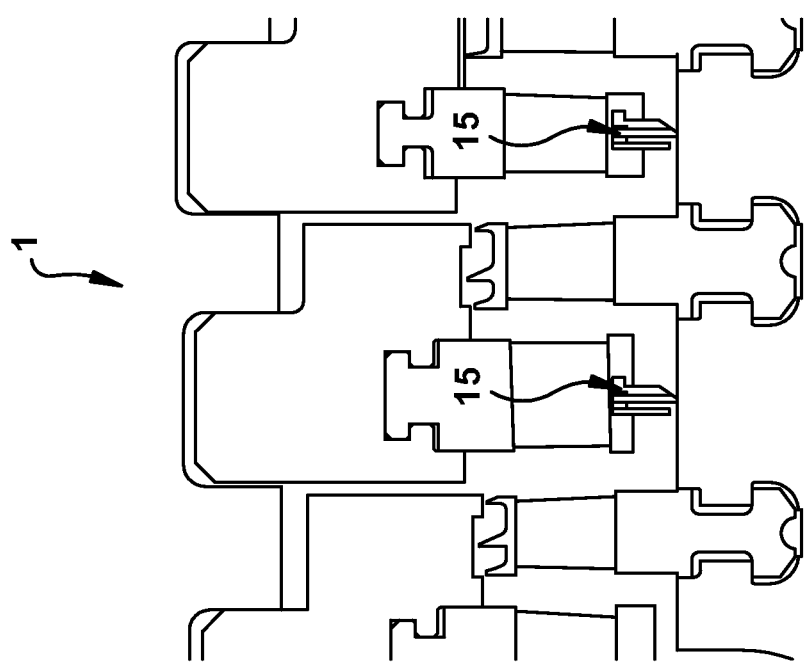
FIG. 1 shows a partial cross-sectional view of a turbomachine including a brush seal as known in the art.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 3:
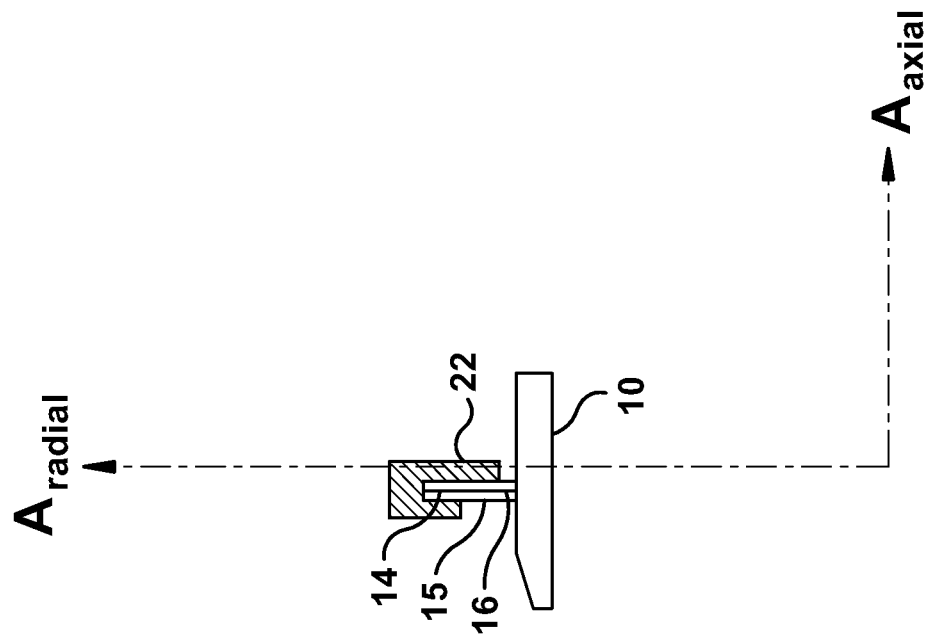
FIGS. 2 and 3 show cross-sectional views of a brush seal as known in the art.
Figure 2:
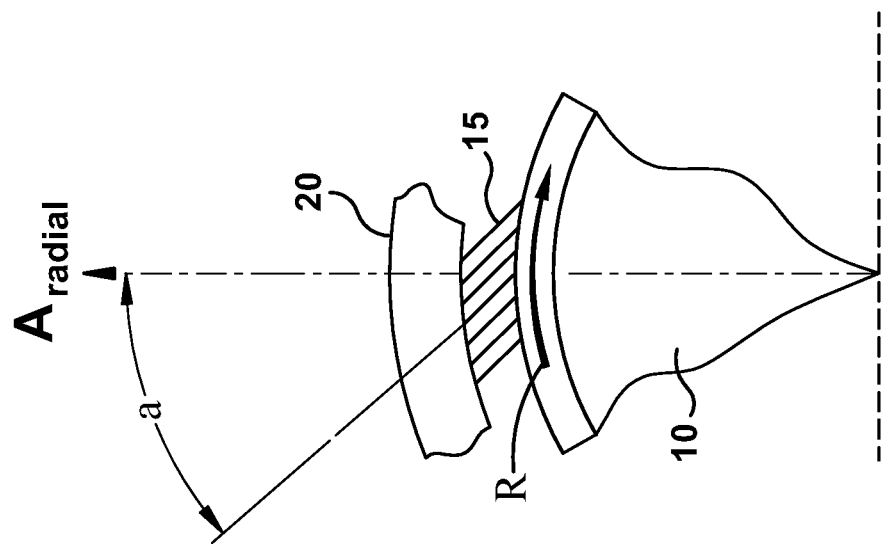

Turning now to the drawings, FIG. 1 shows a cross-sectional view of a conventional brush seal 15, as known in the art, in use in a turbomachine 1. Two additional views of brush seal 15 are shown in FIGS. 2 and 3. As illustrated in FIGS. 2 and 3, brush seal 15 comprises a set of bristles for use between a rotating component 10 (also referred to as a rotor) and a stationary component 20 of turbomachine 1 (FIG. 1), e.g., gas turbine, steam turbine, etc. It is understood that brush seal 15 forms a ring when installed in turbomachine 1, and typically brush seal 15 comprises a series of arcuate segments forming the complete ring when installed. As known in the art, brush seal 15 has a fixed end 14 mounted or attached to stationary component 20, and a flexible free end 16 that extends towards rotating component 10 to form a dynamic seal. A backing plate 22 can also be included (mounted on stationary component 10 (FIG. 2)), that acts to support flexible free end 16 as it is pressed against backing plate 22 by pressure loading while turbomachine 1 is in an operative state. As shown by arrow R in FIG. 2, in an operative state, rotating component 10 rotates in the direction of arrow, R. As shown in FIGS. 2 and 3, the bristles of brush seal 15 are angled circumferentially with respect to an axial axis, $A_{axial}$, and a radial axis, $A_{radial}$, of rotating component 10. The angled bristles are easy to deflect and will move radially as rotating component 10 undergoes excursion or vibration.

As illustrated by angle, a, in FIG. 2, the bristles of brush seal 15 are angled circumferentially with respect to the axial and radial axes ($A_{axial}$ and $A_{radial}$, shown in FIGS. 2 and 3) of rotating component 10. Since the bristles are angled along the same circumferential direction as rotational direction, R, of rotating component 10, the bristle tips can ride on the surface of rotating component 10 without causing buckling or locking up. The circumferential angle, a, of the bristles, also called the "cant angle" or "lay angle," is orientated such that free end 16 extends in the same direction as rotational direction, R, of rotating component 10.

Figure 4:
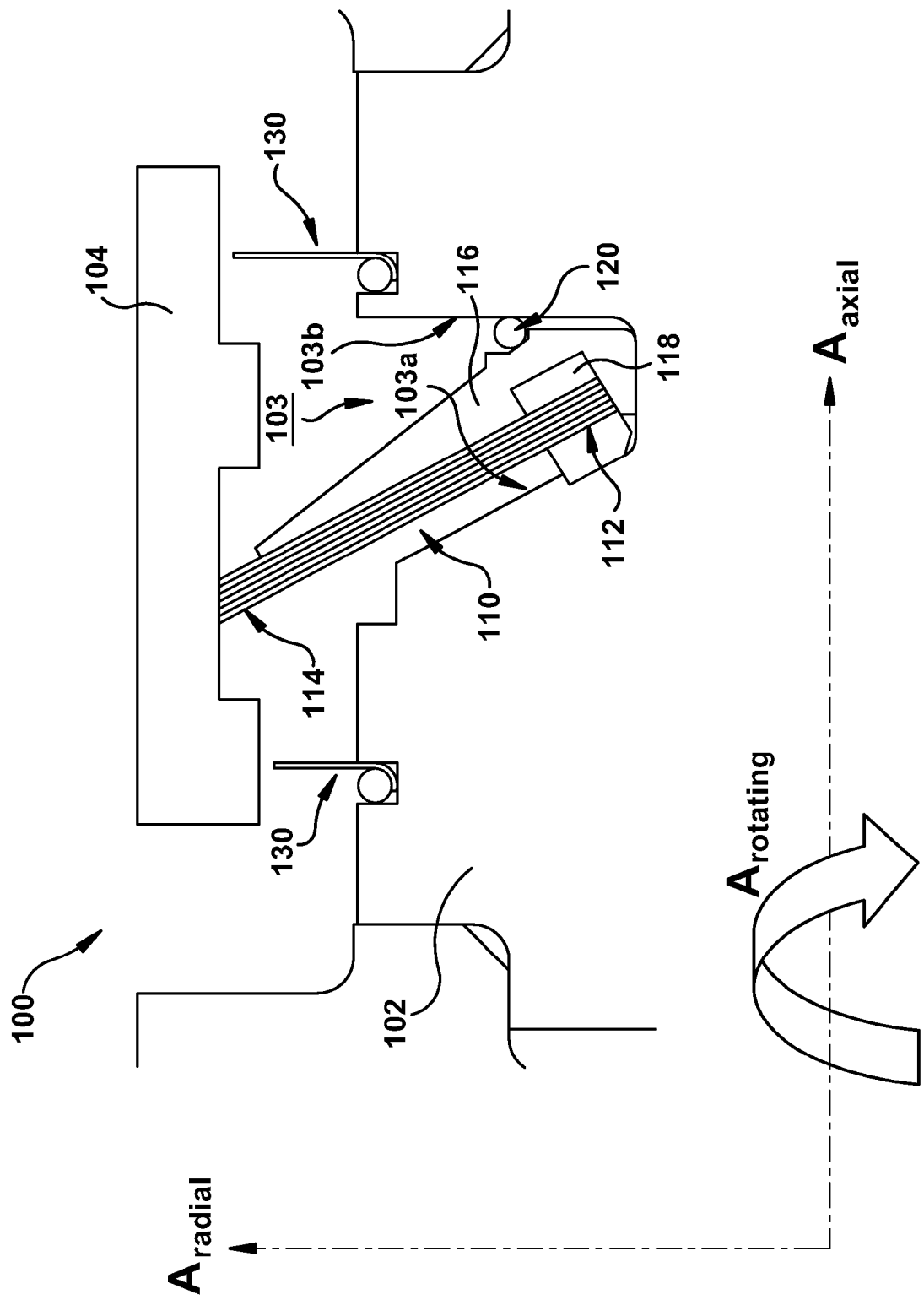
FIGS. 4-8 show cross-sectional views of brush seals according to embodiments of this invention.

Turning to FIG. 4, a cross-sectional view of a brush seal 100 according to embodiments of this invention is shown. Brush seal 100 is used to form a dynamic seal between a rotating component 102 and a stationary component 104 in turbomachine 1 (FIG. 1). Brush seal 100 comprises a set of bristles 110 and forms a ring when installed. For example, brush seal 100 can comprises a series of arcuate segments forming a complete ring when installed. In addition, the set of bristles 110 has a fixed end 112 and a free end 114. However, brush seal 100 differs from known seals in the art in several aspects. For example, as discussed in more detail herein, fixed end 112 is mounted, or attached, to rotating component 102, not stationary component 104. Also, the set of bristles 110 is angled substantially axially, not mainly circumferentially (as in known systems), with respect to rotating axis, $A_{rotating}$, of rotating component 102.

As shown in FIG. 4, brush seal 100 further includes a conical retaining plate 116 that at least partially supports, i.e., bears a partial load of, the set of bristles 110. Conical retaining plate 116 extends at least partially along a radial length of the set of bristles 110 such that, in an operative state of the turbomachine, conical retaining plate 116 at least partially supports the set of bristles 110 from centrifugal loading.

As referenced above, embodiments of this invention include a brush seal 100 having a fixed end 112 mounted, or attached to, rotating component 102. FIGS. 4-8 show various examples of how fixed end 112 of set of bristles 110 can be mounted or attached to rotating component 102. As shown in FIGS. 4-8, a circumferential groove 103 can be included in rotating component 102. Circumferential groove 103 has a first, front, side 103a and a second, back, side 103b (FIG. 4). Conical retaining plate 116 and fixed end 112 of the set of bristles 110 can be inserted into groove 103, and attached to rotating component 102 as desired. In a first example, shown in FIG. 4, retaining plate 116 can be attached to second, back, side 103b through the use of caulks and/or welds (e.g., caulk 120 and/or welds along faces of retaining plate 116 that contact groove 103), and fixed end 112 can be attached to first, front, side 103a and retaining plate 116 through the use of a side plate 118. It is also understood that brazed or soldered joints can be used in conjunction with, or in place of, the caulk and welded joints discussed herein.

Figure 5:
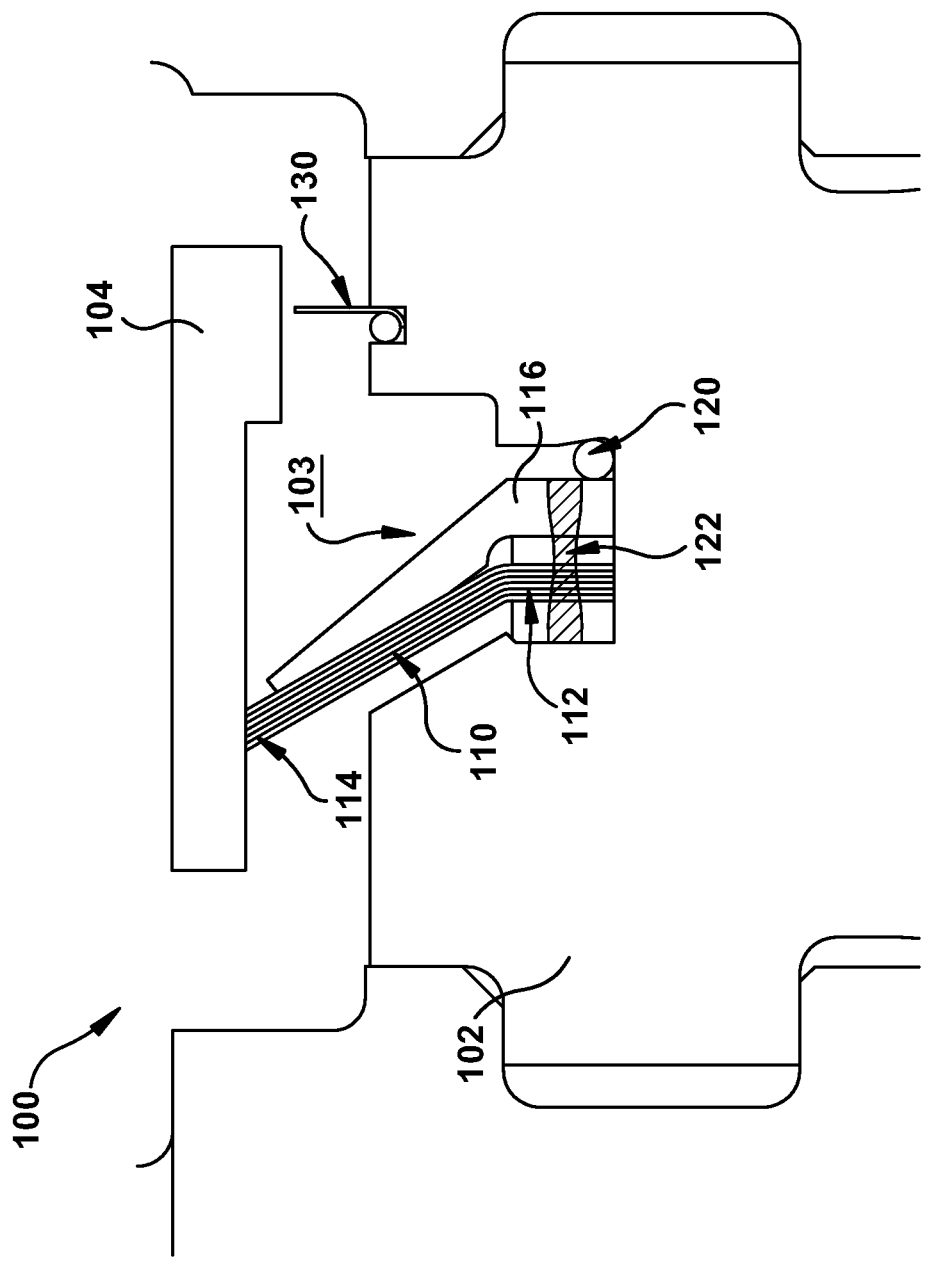

In a second example, shown in FIG. 5, the set of bristles 110 is bent such that fixed end 112 is axially displaced with respect to free end 114. Therefore, conical retaining plate 116 is similarly bent, such that conical retaining plate 116 extends along at least a portion of the length of the set of bristles 110. Again, as in FIG. 4, retaining plate 116 and the set of bristles 110 can be attached to groove 103 through the use of caulks and welds. An electron beam weld 122, shown in FIG. 5, is another example of how the set of bristles 110 may be attached to retaining plate 116.

Figure 6:
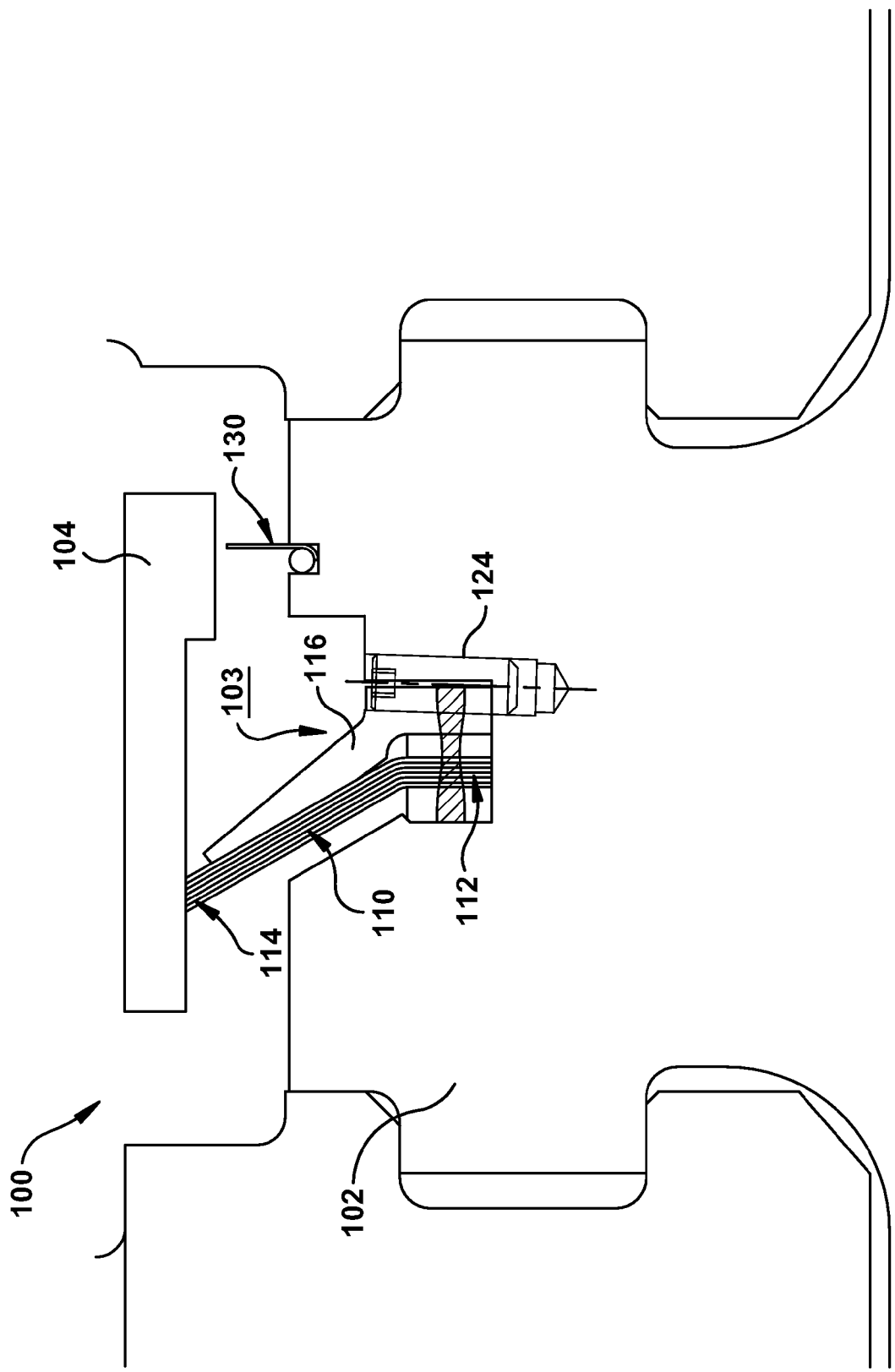

In a third example, shown in FIG. 6, the set of bristles 110 is bent as in FIG. 5, but in this example, a screw 124, e.g., a grub screw, is used to attach retaining plate 116 to rotating component 102. Screw 124 can be screwed through retaining plate 116 into rotating component 102, in addition to, or in place of, the caulk/friction combination that is used in FIGS. 4 and 5. It is also understood that other fasteners, other than a screw, can be used, for example, a bolt, a pin, etc.

Figure 7:
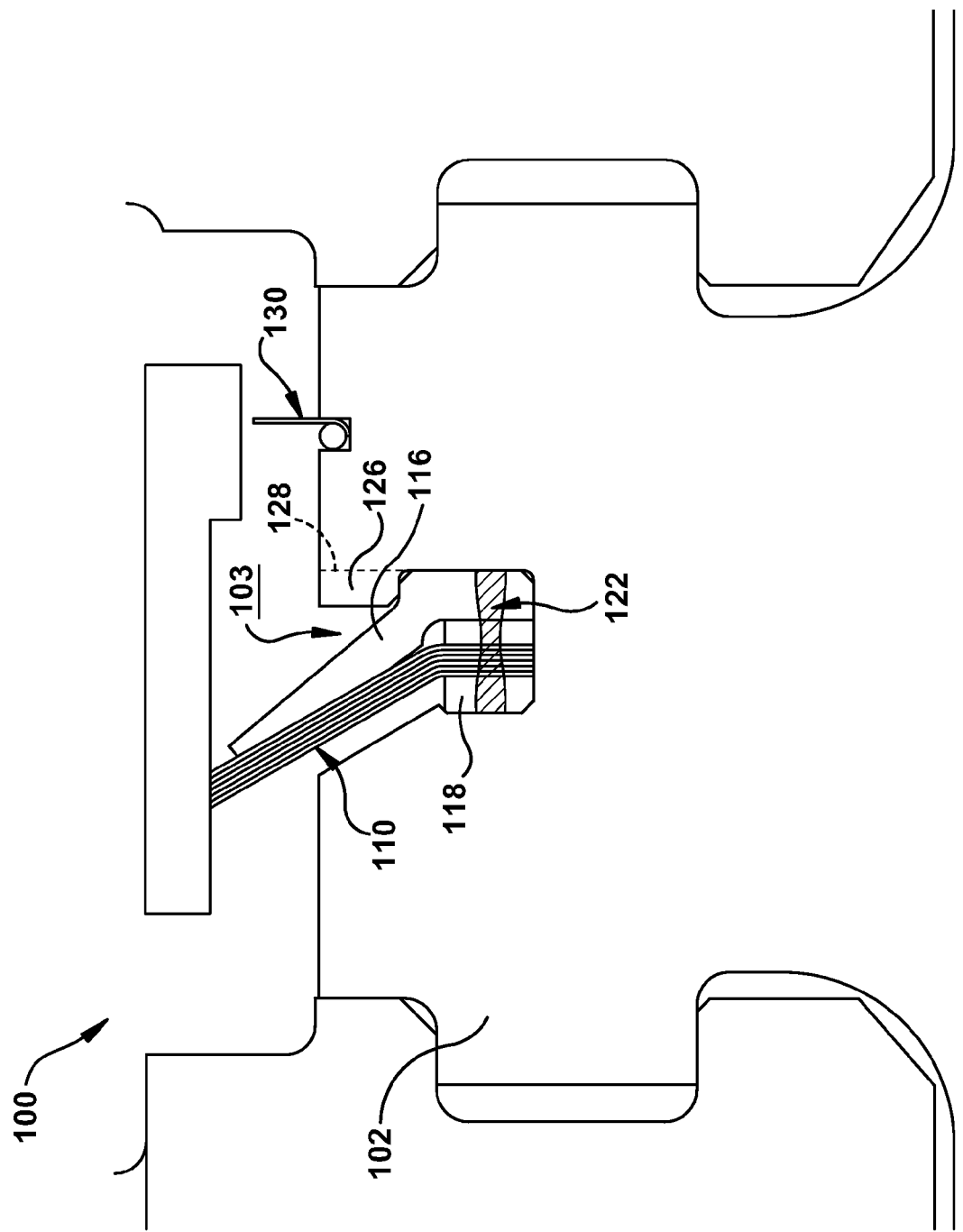

In a fourth example, shown in FIG. 7, a dovetail assembly can be used to attach retaining plate 116 and the set of bristles 110 to rotating component 102. In this example, groove 103 includes a retaining feature 126 which holds retaining plate 116 (which is attached to the set of bristles 110 through the use of a weld 122 and side plate 118 in this example) in place once the set of bristles 110 is slid circumferentially into groove 103. In order to facilitate sliding the set of bristles 110 into groove 103, an entry dovetail slot 128 can be used (illustrated by dotted line in FIG. 7).

In any of the embodiments discussed herein, retaining plate 116 can be integrally machined into rotating component 102 or can comprise a separate element that is welded or otherwise attached to rotating component 102. If retaining plate 116 is integral to rotating component 102, as discussed herein, an entry groove/slot (similar to slot 128 shown in FIG. 7) can be used to insert the set of bristles 110 into rotating component 102. In this embodiment, a relatively small entry slot 128 can be used, and this embodiment could result in a relatively more compliant brush seal 100 because the set of bristles 110 could be bent as it is fed into the groove/slot. Bending the set of bristles 110 in this way could result in less gap leakages between the segments of brush seal 100, as well as minimize the issues of holding the set of bristles 110 in the area of the entry slot. This embodiment would further reduce the total rotating mass of brush seal 100 as an additional back plate would not be necessary.

Figure 8:
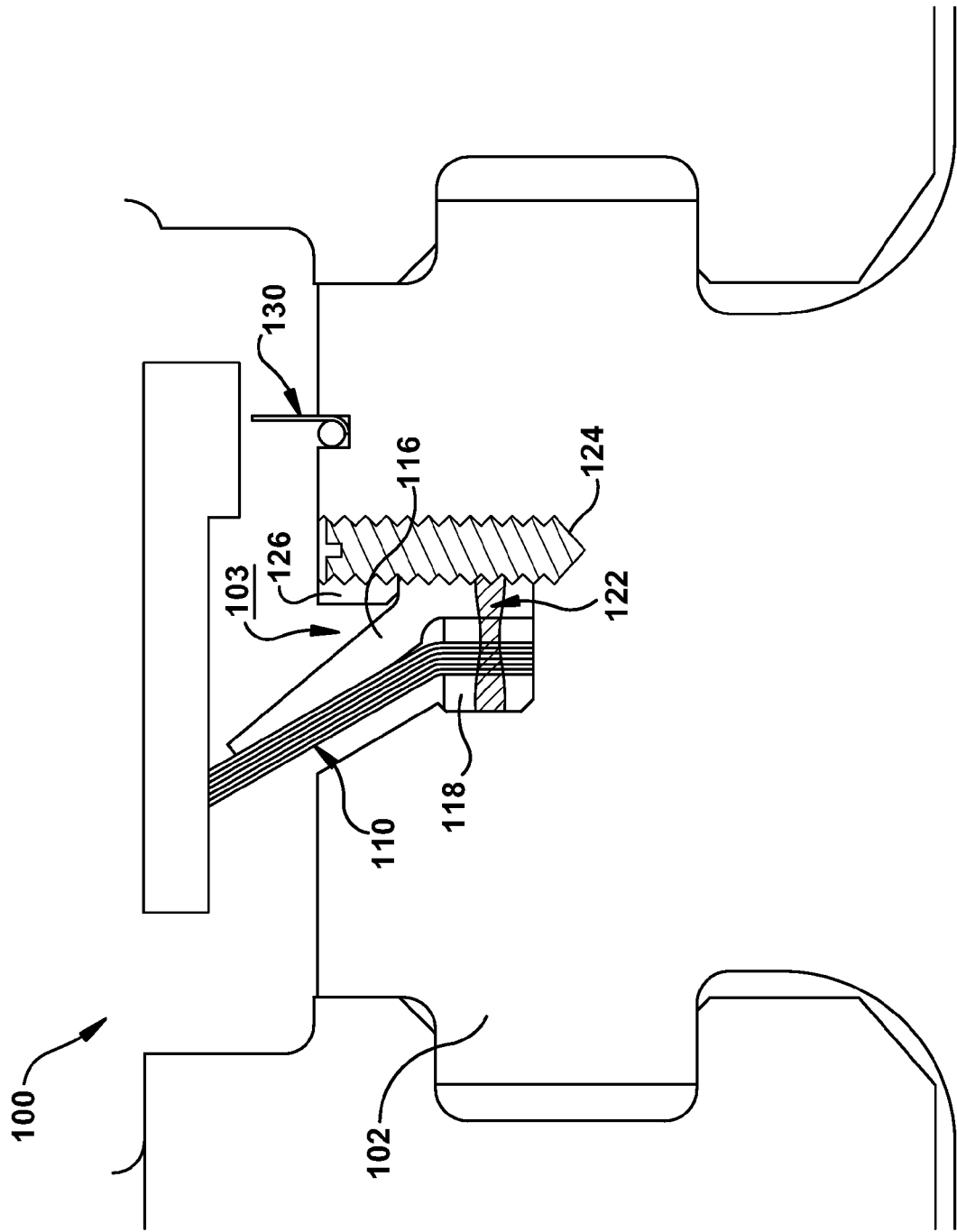

In another embodiment, shown in FIG. 8, a modification of the configurations shown in FIGS. 6 and 7 is shown. In this embodiment, shown in FIG. 8, a retaining feature 126 (similar to FIG. 7) can be used along with a pin or grub screw 124 (similar to FIG. 6), where one or more pins 124 can act as anti-rotation mechanisms for brush seal 100 elements. A variety of configurations for pins 124 are possible (and applicable to any embodiments shown herein including pins 124). For example, (1) one anti-rotation pin 124 per segment can be used, with pins 124 either at a middle section of a segment, or just inboard of the end of the segment to limit segment movement which could lead to imbalance, (2) one anti-rotation pin 124 can be used, positioned on each side of the entry slot 128 (FIG. 7), or (3) one anti-rotation pin 124 can be used, positioned between the two adjacent segment ends, and centered in the middle of entry slot 128 (FIG. 7).

Regardless of how brush seal 100 is mounted to rotating component 102, the axial angle of the set of bristles 110 of brush seal 100 assists in allowing brush seal 100 to seal effectively. Since brush seal 100 rotates with rotating component 102, if the set of bristles 110 were angled substantially circumferentially, the centrifugal loading would tend to straighten the bristles out and cause bending stress at the root of the bristles. In addition, if the set of bristles 110 are allowed to straighten out, the bristles will not move inward easily, and can buckle or be damaged when brush seal 100 moves toward stationary component 104 during rotor excursion or vibration. Therefore, a large cant angle is not desirable for rotating brush seal 100 according to embodiments of this invention.

Therefore, as discussed herein, the set of bristles 110 is not angled substantially circumferentially as in prior art brush seals, but rather is mainly angled axially, and is supported by conical retaining plate 116. This is further illustrated in FIG. 9, showing a partial axial cross-sectional view of brush seal 100, showing the set of bristles 110 are not substantially circumferentially angled. When the turbomachine is in an operative state, the set of bristles 110 is pressed against retaining plate 116 by centrifugal force. Angling the set of bristles 110 axially, in accordance with embodiments of this invention, will cause the bristles to bend forward and away from conical retaining plate 116 if seal 100 is pushed by stationary component 104.

As also shown in FIG. 9, brush seal 100 can comprise a series of arcuate segments (three segments S1, S2, S3 are partially shown in FIG. 9, but it is understood that in practice, brush seal 100 can comprise a plurality of arcuate segments that will form a complete ring.) As shown in FIG. 9, gaps 132 are typically included between segments, referred to as butt gaps 132. As shown in FIG. 9, a spring 134 can be inserted in one or more butt gaps 132. Springs 134 can act to allow for thermal expansion due to brush seal 100 heating faster than rotating component 102 on startup as well as to account for different coefficients of thermal expansion between rotating component 102 and brush seal 100. Springs 134 also act to keep pressure on the segments to damp aeromechanical vibration. Springs 134 can comprise thin and stiff springs, such as wave springs, of any shape desired. Three examples of different shapes and configurations of springs 134 are shown in the exploded views of gaps 132 in FIGS. 10-12. FIG. 9 further shows an anti-rotation grub screw 124 (as discussed in connection with FIG. 8), with grub screw 124 position in the middle of segment S2.

In one embodiment of the invention, the pressure loading is from left to right referring to FIGS. 4-8, with the set of bristles 110 facing a higher pressure side of the brush seal, while retaining plate 116 is exposed to a downstream side of the brush seal with lower pressure. In such an arrangement, both the pressure force and centrifugal force act to press the set of bristles 110 against retaining plate 116 and balance the pressure loading. In another embodiment of the invention, the pressure loading can be from right to left (or vice versa, depending on the orientation of the turbomachine), where the retaining plate 116 is exposed to the higher pressure side, and the set of bristles 110 faces the lower pressure side.

The axial angle of the set of bristles 110 can be set to achieve desired flexibility without requiring excessive axial space. In one embodiment, the set of bristles 110 can be angled in an axial direction with respect to rotating component 102 at an axial angle of approximately 15 degrees to approximately 70 degrees, for example, at approximately 30 to 45 degrees.

As discussed herein, a circumferential angle of the set of bristles 110 is not necessary to make brush seal 100 flexible.

However, a small circumferential angle, substantially less than the axial angle, may be beneficial for seal 100, not for flexibility reasons, but for operability, for example, in the range of approximately 0 to 15 degrees. Therefore, a small cant angle in a circumferential direction can be used, where the set of bristles 110 will contract owing to the cant angle, opening up clearance between seal 100 and stationary component 104 at no or low speed to avoid rub during transient. As speed goes up to operating condition, the set of bristles 110 will stretch out, reducing the cant angle, thus closing up the gap between the tips of the set of bristles 110 and stationary component 104.

An additional benefit of brush seal 100 according to embodiments of this invention is that the heat generated by brush seal 100 will not cause rotor bowing like conventional brush seals because the bristle tips slide on stationary component 104. The heat generated by the rubbing of the tips of the set of bristles 110 on stationary component 104 will partly go into stationary component 104 and partly be taken away by leakage through the set of bristles 110. Therefore, there is little to no heat going into rotating component 102. In contrast, in conventional brush seals, the bristle tips rub the surface of the rotating component, which heats up the rotating component directly. This heating of the rotating component can cause the rotating component to bow and further increase undesirable non-uniform heating.

As shown in FIGS. 4-8, additional seals can also be used in conjunction with brush seal 100. For example, one or more tooth seals, such as J-strip seals 130, can be used. J-strip seals 130 can have a fixed end attached to rotating component 102 and a free end extending radially outward from rotating component 102 toward stationary component 104. J-strip seals 130 can be positioned axially upstream and/or downstream of brush seal 100.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A brush seal for use between a rotating component and a stationary component in a turbomachine, the brush seal comprising:
    a set of flexible bristles having a fixed end and a free end,
    a conical retaining plate,
    a circumferential groove in the rotating component, the circumferential groove having a downstream side and an upstream side, and
    a side plate attached to the upstream side of the circumferential groove,
    wherein the fixed end of the set of flexible bristles is attached to the upstream side of the circumferential groove by the side plate and the conical retaining plate is attached to both the downstream and upstream side of the circumferential groove, the conical retaining plate being attached to the upstream side of the circumferential groove by the side plate in the rotating component,
    wherein the free end of the set of flexible bristles seals against a radially inward surface of the stationary component,
    wherein the conical retaining plate extends radially outward from the rotating component at least partially along a length of the set of flexible bristles, such that the conical retaining plate is configured to at least partially support the set of flexible bristles on a radially inner surface of the conical retaining plate from centrifugal loading in an operative state of the turbomachine, and
    wherein the set of flexible bristles are angled axially at an axial angle of approximately 15 degrees to approximately 70 degrees with respect to the rotating component, and the set of flexible bristles are angled circumferentially at an angle that is less than the axial angle.

2. The brush seal of claim 1, wherein the axial angle is approximately 30 degrees to approximately 45 degrees.

3. The brush seal of claim 1, wherein the conical retaining plate is attached to the downstream side of the circumferential groove by at least one of the following: caulk, a welded joint, a brazed joint, a soldered joint, a screw, a bolt, and a pin.

4. The brush seal of claim 1, wherein the set of flexible bristles is bent, and an axial position at which the fixed end of the set of flexible bristles is attached to the circumferential groove is axially displaced with respect to an axial position at which the free end of the set of flexible bristles seals against the radially inward surface of the stationary component.

5. A turbomachine comprising:
    a rotating component having a circumferential groove therein, the circumferential groove having an upstream side and a downstream side;
    a side plate attached to the upstream side of the circumferential groove,
    a stationary component; and
    a brush seal for use between the rotating component and the stationary component, the brush seal comprising:
        a set of flexible bristles having a fixed end and a free end, and
        a conical retaining plate extending at least partially along a length of the set of flexible bristles, such that the conical retaining plate is configured to at least partially support the set of flexible bristles on a radially inner surface of the conical retaining plate from centrifugal loading in an operative state of the turbomachine,
    wherein the fixed end of the set of bristles is attached to the upstream side of the circumferential groove by the side plate and the conical retaining plate is attached to both the downstream and upstream side of the circumferential groove in the rotating component, the conical retaining plate being attached to the upstream side of the circumferential groove by the side plate,
    wherein the free end of the set of flexible bristles seals against a radially inward surface of the stationary component, and wherein the set of flexible bristles are angled axially at an axial angle of approximately 15 degrees to approximately 70 degrees with respect to the rotating component.

6. The brush seal of claim 5, wherein the flexible bristles are angled circumferentially at an angle less than the axial angle.

7. The turbomachine of claim 5, wherein the conical retaining plate is attached to the upstream side of the circumferential groove by one of the following: caulk, a welded joint, a brazed joint, a soldered joint, a screw, a bolt, a pin and a dovetail.

8. The turbomachine of claim 7, wherein the set of flexible bristles faces a high-pressure side of the brush seal, and the conical retaining plate is exposed to a downstream, low-pressure side of the brush seal.

9. The turbomachine of claim 5, wherein the set of flexible bristles is bent, and an axial position at which the fixed end of the set of flexible bristles is attached to the circumferential groove is axially displaced with respect to an axial position at which the free end of the set of flexible bristles seals against the radially inward surface of the stationary component.

10. The turbomachine of claim 5, wherein the rotating component further includes at least one seal tooth extending radially outward from the rotating component toward the stationary component, and
wherein the seal tooth is axially disposed one of either upstream of the brush seal and the circumferential groove or downstream of the brush seal and the circumferential groove.

11. The turbomachine of claim 5, wherein the brush seal further comprises a series of arcuate segments collectively forming a ring disposed about a circumference of the rotating component within the circumferential groove.

12. The turbomachine of claim 11, wherein the brush seal further comprises a wave spring disposed between each of the series of arcuate segments, and wherein the stationary component includes a recess that is axially aligned with the brush seal.

13. The brush seal of claim 1, wherein the conical retaining plate is retained within the circumferential groove by a dovetail assembly, the dovetail assembly comprising:
a retaining feature disposed on a radially outer portion of the circumferential groove, and
an entry dovetail slot for inserting the set of flexible bristles into the circumferential groove.

14. The brush seal of claim 13, further comprising a threaded fastener extending radially inward through a portion of the retaining feature and engaging the conical retaining plate.

15. The brush seal of claim 14, wherein the threaded fastener comprises is a grub screw.

16. A brush seal for use between a rotating component and a stationary component in a turbomachine, the brush seal comprising:
a circumferential groove in the rotating component having an upstream side and a downstream side;
a side plate attached to the downstream side of the circumferential groove,
a set of flexible bristles having a fixed end and a free end, wherein the fixed end of the set of flexible bristles is attached to the downstream side of the circumferential groove by the side plate, and the free end of the set of flexible bristles seals against a radially inward surface of the stationary component; and
a conical retaining plate,
wherein the conical retaining plate is attached to the upstream side of the circumferential groove by a dovetail assembly, the dovetail assembly including:
a retaining feature disposed on a radially outer portion of the circumferential groove,
an entry dovetail slot for inserting the set of flexible bristles into the circumferential groove, and
a threaded fastener extending radially inward through a portion of the retaining feature and engaging the conical retaining plate;
wherein the conical retaining plate is attached to the downstream side of the circumferential groove by the side plate;
wherein the conical retaining plate extends radially outward from the rotating component at least partially along a length of the set of flexible bristles, such that the conical retaining plate is configured to at least partially support the set of flexible bristles on a radially inner surface of the conical retaining plate from centrifugal loading in an operative state of the turbomachine, and
wherein the set of flexible bristles are axially angled at an angle of approximately 15 degrees to approximately 70 degrees with respect to the rotating component, and the set of flexible bristles are circumferentially angled at an angle that is less than the axial angle.

17. The brush seal of claim 16, wherein the set of flexible bristles is bent, and an axial position at which the fixed end of the set of flexible bristles is attached to the circumferential groove is axially displaced with respect to an axial position at which the free end of the set of flexible bristles seals against the radially inward surface of the stationary component.

18. The brush seal of claim 16, wherein the brush seal further comprises a series of arcuate segments collectively forming a ring disposed about a circumference of the rotating component within the circumferential groove.

* * * * *